(12) United States Patent
Henshaw (10) Patent No.: US 10,167,083 B2
(45) Date of Patent: Jan. 1, 2019

(54) CRADLE RECLINE MECHANISM FOR FIXED-SHELL AIRCRAFT SEAT

(71) Applicant: B/E Aerospace, Inc., Wellington, FL (US)

(72) Inventor: Robert J. Henshaw, Newnan, GA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 14/676,009

(22) Filed: Apr. 1, 2015

(65) Prior Publication Data

US 2015/0284087 A1    Oct. 8, 2015

Related U.S. Application Data

(60) Provisional application No. 61/973,957, filed on Apr. 2, 2014.

(51) Int. Cl.
   *B64D 11/00* (2006.01)
   *B64D 11/06* (2006.01)

(52) U.S. Cl.
   CPC ................... *B64D 11/064* (2014.12)

(58) Field of Classification Search
   None
   See application file for complete search history.

(56) References Cited

U.S. PATENT DOCUMENTS

| | | | |
|---|---|---|---|
| 3,594,037 A | | 7/1971 | Sherman |
| 3,999,799 A | * | 12/1976 | Daswick ............... A47C 3/0257 |
| | | | 297/270.3 |
| 5,931,531 A | * | 8/1999 | Assmann ............ A47C 1/03255 |
| | | | 297/300.2 |
| 6,059,364 A | * | 5/2000 | Dryburgh ............. A47C 1/0352 |
| | | | 105/322 |
| 6,119,980 A | * | 9/2000 | Ferry .................... A47C 1/0352 |
| | | | 244/118.6 |
| 6,641,214 B2 | * | 11/2003 | Veneruso ............. B60N 2/0232 |
| | | | 297/216.15 |
| 7,007,965 B2 | * | 3/2006 | Bernatsky ................ A61G 5/12 |
| | | | 280/250.1 |
| 8,403,415 B2 | * | 3/2013 | Lawson ................. B64D 11/06 |
| | | | 297/318 |

(Continued)

FOREIGN PATENT DOCUMENTS

DE    102012108351 A1    3/2014

OTHER PUBLICATIONS

International Search Report and Written Opinion of corresponding International Application No. PCT/US2015/023837; dated Jun. 18, 2015; 11 pages.

*Primary Examiner* — Charles A Fox
*Assistant Examiner* — Christopher E Veraa
(74) *Attorney, Agent, or Firm* — Clements Bernard Walker PLLC (57) ABSTRACT

A fixed-shell aircraft passenger seat including a seat bottom pivotably attached to a seatback, a fixed-shell positioned behind the seatback, left and right spreaders guiding the seat bottom forward and lower as the seat bottom moves to a reclined sitting position, a linkage arm linked with movement of the seat bottom, and a locking gas spring arranged between the linkage arm and a fixed seat frame member for counterbalancing passenger weight to return the seat bottom to upright and prevent over acceleration into a cradle recline sitting position.

15 Claims, 7 Drawing Sheets

(56) References Cited

U.S. PATENT DOCUMENTS

| | | | |
|---|---|---|---|
| 2003/0080597 A1* | 5/2003 | Beroth | A47C 1/0352 297/330 |
| 2004/0036336 A1* | 2/2004 | Veneruso | B60N 2/0232 297/354.13 |
| 2005/0017561 A1* | 1/2005 | Burmeister, III | B60N 2/015 297/354.12 |
| 2005/0077769 A1* | 4/2005 | Aramburu Echeverria | A47C 1/025 297/327 |
| 2010/0132118 A1* | 6/2010 | Robertson | A47C 1/0342 5/617 |
| 2010/0230540 A1* | 9/2010 | Dowty | B64D 11/064 244/122 R |
| 2010/0253129 A1* | 10/2010 | Dowty | B60N 2/4495 297/85 M |
| 2010/0259081 A1* | 10/2010 | Kuno | B60N 2/2209 297/284.4 |
| 2012/0104819 A1* | 5/2012 | Line | B60N 2/163 297/326 |
| 2012/0217779 A1* | 8/2012 | Gaither | B60N 2/242 297/316 |
| 2012/0313406 A1* | 12/2012 | Darbyshire | B64D 11/06 297/188.11 |

\* cited by examiner

CRADLE RECLINE MECHANISM FOR FIXED-SHELL AIRCRAFT SEAT

CROSS-REFERENCE TO RELATED APPLICATION

This application claims priority from U.S. Application No. 61/973,957 filed Apr. 2, 2014, the entirety of which is incorporated by reference herein.

TECHNICAL FIELD AND BACKGROUND OF THE INVENTION

The present invention relates generally to a recline-capable fixed-shell aircraft seat, and more particularly, to a cradle recline mechanism for a fixed-shell aircraft seat in which the seatback reclines as the seat bottom translates forward and lower to the floor, providing greater comfort with less pitch thereby reducing the need for leg and foot rests.

Fixed-shell aircraft seats offer numerous benefits for premium economy passengers in an intermediary cabin. In a fixed-shell seat, the seat reclines inside its fixed-shell, providing an optimum rest position with plenty of legroom while preserving each passenger's personal space. Fixed-shell seats can also be equipped with a leg rest that can be adjusted in height, as well as an adjustable headrest.

The degree of seatback recline in a fixed-shell seat is limited by the seat pitch. Conventional fixed-shell seats with translating seat bottoms require a seat pitch greater than 1 meter, thereby sacrificing seating density. Conventional fixed shell seats also recline without cradling, thereby sacrificing comfort. Therefore, what is needed is a cradling mechanism for a fixed-shell seat that provides greater comfort in an equivalent or lesser conventional fixed-shell seat pitch.

BRIEF SUMMARY OF THE INVENTION

It is therefore an object of the invention to provide an aircraft passenger seat having a unique cradling motion created by the forward translation and lowering of the seat pan in recline and a related counterbalancing mechanism that allows the seat to both return upright and prevent it from over accelerating into the reclined position.

It is another object of the invention to provide an aircraft seat having a unique cradling motion with greater comfort than prior art seats with an equivalent seat pitch.

It is another object of the invention to provide an aircraft passenger seat having a cradled seat pan that lowers when the seatback is reclined to provide greater living space and reduce the need for leg and foot rests.

It is another object of the invention to provide a seat mechanism that allows the seat pan to translate from the upright position forward into a cradle position in as little as 1 meter of seat pitch.

It is another object of the invention to provide an aircraft passenger seat including a locking gas spring for counterbalancing the weight of the passenger as the seat reclines and returns upright.

It is another object of the invention to provide a counterbalancing mechanism for aircraft seat movement that has a low spatial volume and weight.

To achieve the foregoing and other objects and advantages, in one embodiment the present invention provides a fixed-shell aircraft passenger seat including a seat bottom, a seatback pivotably attached to the seat bottom, a fixed-shell positioned behind the seatback, left and right spreaders guiding the seat bottom forward and lower as the seat bottom moves from an upright sitting position to a cradle recline sitting position, a linkage arm linked with movement of the seat bottom, and a locking gas spring arranged between the linkage arm and a fixed seat frame member for counterbalancing passenger weight to return the seat bottom to the upright sitting position and prevent over acceleration into the cradle recline sitting position.

In another aspect, each of the left and right spreaders may define an arcuate roller track along which vertically-oriented rollers on opposite sides of the seat bottom travel as the seat bottom moves between the upright and cradle recline sitting positions.

In another aspect, the vertically-oriented rollers may include a seat bottom attachment roller and an idler roller positioned forward of the seat bottom attachment roller in the arcuate roller track.

In another aspect, the seat bottom attachment roller may be positioned at a rearwardmost end of the arcuate roller track when the seat bottom is fully upright, and the idler roller may be positioned at a forwardmost end of the arcuate roller track when the seat bottom is fully reclined.

In another aspect, the seat bottom may be horizontal in the upright sitting position and inclined in the direction of a forward end thereof in the cradle recline sitting position.

In another aspect, the seat may include an arcuate rail that moves with the seat bottom and a geared pinion timing axle meshed with teeth on the arcuate rail to keep opposite sides of the seat bottom running parallel.

In another aspect, the linkage arm and the arcuate rail may attach at the seat bottom attachment roller.

In another aspect, the linkage arm may be fixed at one end for movement with the seat bottom and pivotably attached proximate an opposite end thereof to the fixed seat frame member positioned beneath the seat bottom.

In another aspect, the locking gas spring may be arranged such that maximum force is exerted on the linkage arm when the seat bottom is closest to fully reclined, and when the seat bottom is in the upright sitting position the locking gas spring is fully extended and pushes against the linkage arm with minimum force.

In another aspect, the seat may include vertically-oriented forward rollers positioned proximate a forward end of each of the left and right spreaders on inboard sides thereof that travel along arcuate tracks on opposite sides of the seat bottom.

According to another embodiment, the present invention provides a fixed-shell aircraft passenger seat configured for cradle recline movement including a seatback pivotably connected to a seat bottom such that seat bottom movement drives seatback movement between an upright sitting position and a reclined sitting position, a fixed-shell positioned behind the seatback, left and right spreaders guiding the seat bottom forward and lower as the seat bottom moves from the upright sitting position to the reclined sitting position, a linkage arm linked with movement of the seat bottom, and a passenger weight counterbalancing mechanism arranged beneath the seat bottom.

In another aspect, the seatback may bear against the fixed-shell as the seatback moves between the upright and reclined sitting positions.

In another aspect, the passenger weight counterbalancing mechanism may be a locking gas spring arranged such that maximum force of the locking gas spring is exerted on the linkage arm when the seat bottom is closest to fully reclined, and when the seat bottom is in the upright sitting position the locking gas spring is fully extended and pushes against the linkage arm with minimum force.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

Features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Referring to FIGS. 1-5, a fixed-shell aircraft seat employing a cradling recline motion according to one embodiment of the invention is shown generally at reference numeral 20. Seat 20 is a fixed-shell aircraft seat, meaning that the seatback reclines within and relative to a fixed-shell positioned behind the seatback. In one embodiment, the seatback may bear against the fixed-shell, such as by rollers. Fixed-shell aircraft seats are typically found in economy and business class seating sections of an aircraft where the fixed-shell protects the living space of an aft-seated passenger and serves as the mounting structure for video monitors, tray tables and other amenities for use by the aft-seated passenger. Fixed-shell aircraft seats are capable of reclining to some degree within their fixed shell, but are typically incapable of reclining fully to achieve a horizontal bed.

Figure 1:
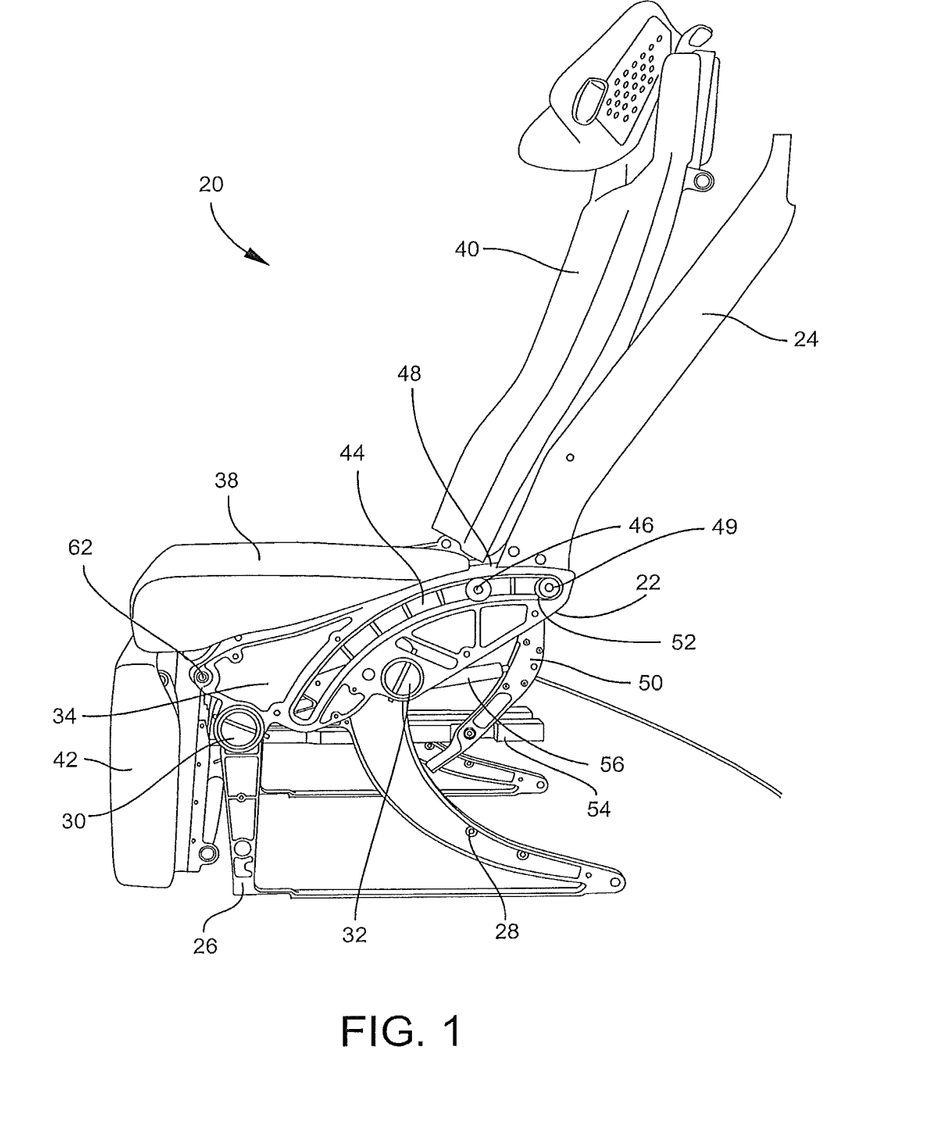
FIG. 1 is a left side view of an aircraft passenger seat in an upright sitting position according to one embodiment of the invention.
Figure 2:
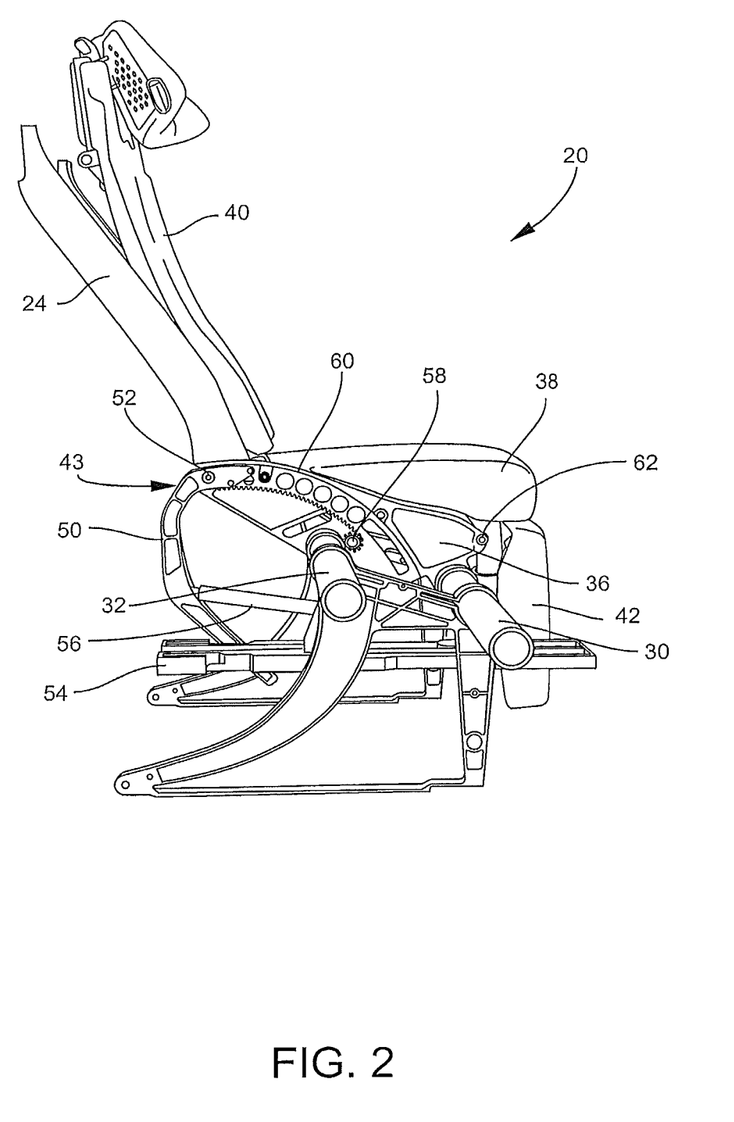
FIG. 2 is a right side view of the seat of FIG. 1.

Seat 20 generally includes a seat base frame 22 and a rear fixed-shell 24. The seat base frame 22 generally includes front and rear legs 26, 28 attached to respective front and rear transverse beam tubes 30, 32 that may be shared with a laterally adjacent seat. The front and rear legs 26, 28 may attach to seat tracks in the floor using conventional anti-rattle track fasteners. The front and rear beam tubes 30, 32 cooperatively support left and right spreaders 34, 36 configured to guide the movement of the seat from upright to reclined and back again. Each of the left and right spreaders 34, 36 defines an arcuate roller track 44 arranged to guide the movement of the seat bottom 38, and in particular, translate forward and lower the seat bottom to recline the seatback 40. In other words, as the seatback 40 moves from upright to reclined, the seat bottom 38 simultaneously moves forward and lower to the floor.

The seat bottom 38 is pivotably attached to the seatback 40 such that seat bottom movement drives seatback movement. In this arrangement, as the seat bottom 38 is driven forward and lower, the seat bottom 38 pulls the seatback along therewith causing the seatback to lower and recline within and relative to its fixed-shell 24. Seat 20 may optionally include a leg rest 42 that may move together with or independent of the movement of the seat bottom 38. As shown, the leg rest is pivotably attached to the front of the seat bottom 38 such that the leg rest is driven forward with the forward movement of the seat bottom, however, extends independently of the movement of the seat bottom. In this arrangement, the leg rest 42 may steplessly move between a first position in which the leg rest 42 is stowed generally vertically along the front of the seat, and a second position in which the leg rest is generally horizontal. Leg rest movement can be achieved and controlled by a linear actuator positioned beneath the seat bottom 38 and attached to the leg rest 42.

FIGS. 1 and 2 show the seat 20 in an upright sitting position required for taxi, takeoff and landing (TTOL). In the upright sitting position, the seat bottom 38 is generally horizontal and closest to the rear fixed-shell 24, the seatback 40 is at its steepest angle to the floor (i.e., closest to vertical), and the leg rest 42, when present, is stowed generally vertically against the front of the seat. In the fully reclined sitting position, as best shown in FIG. 4, the seat bottom 38 is moved forward and lower, the seatback 40 is reclined to a more shallow angle to the floor, and the seat bottom 38 is inclined slightly to the front to cradle the seated passenger.

Figure 3:
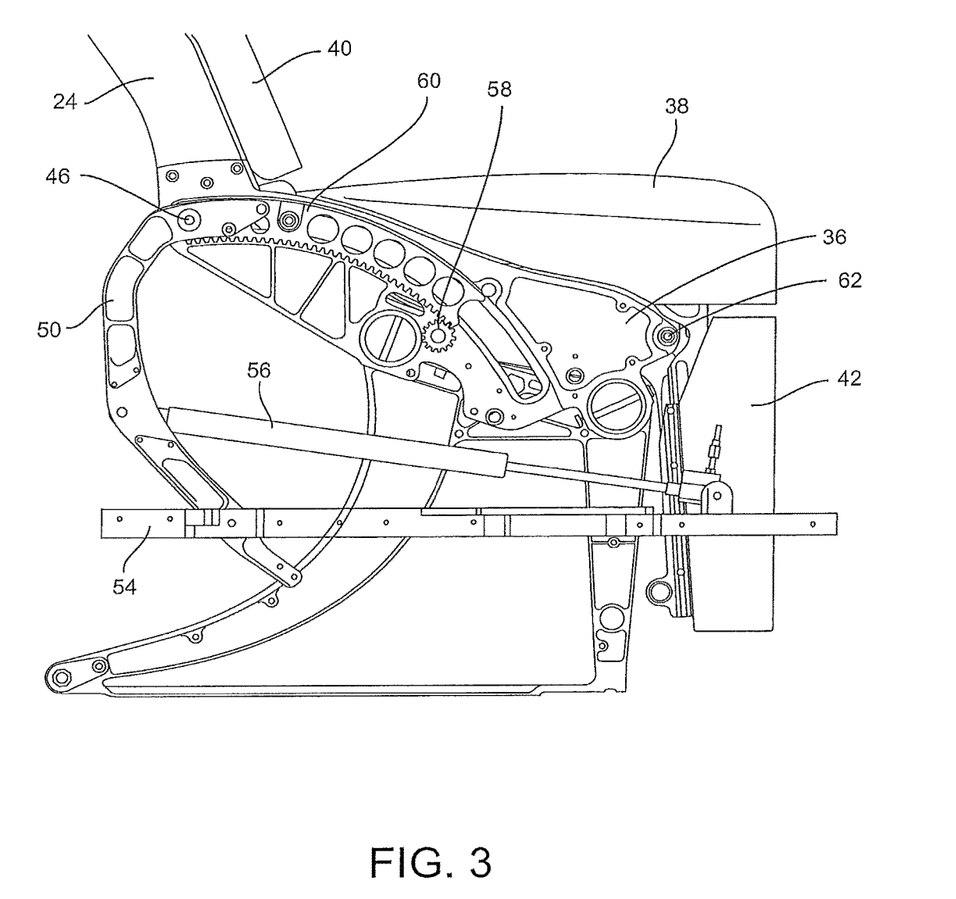
FIG. 3 is a detailed view of the cradling and counterbalancing mechanisms with the seat shown upright.
Figure 4:
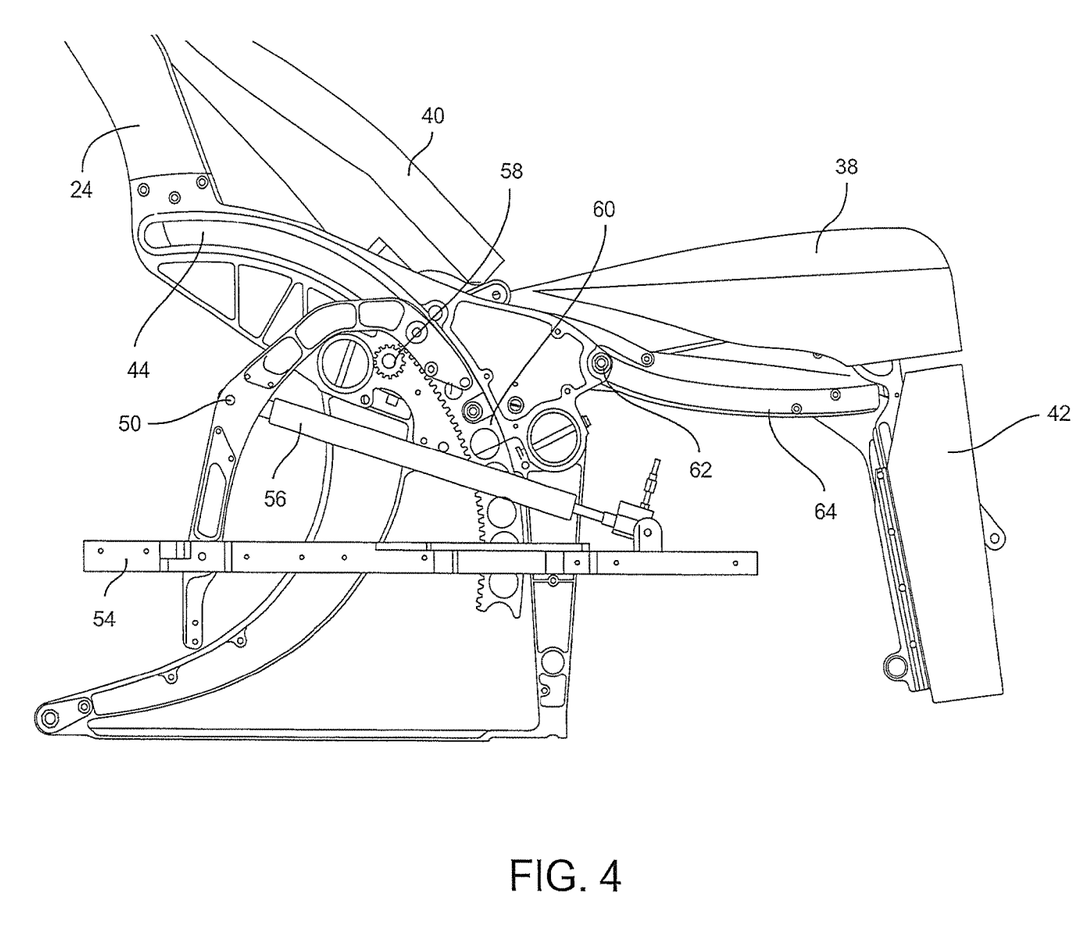
FIG. 4 is a detailed view of the cradling and counterbalancing mechanism with the seat shown reclined.
Figure 5:
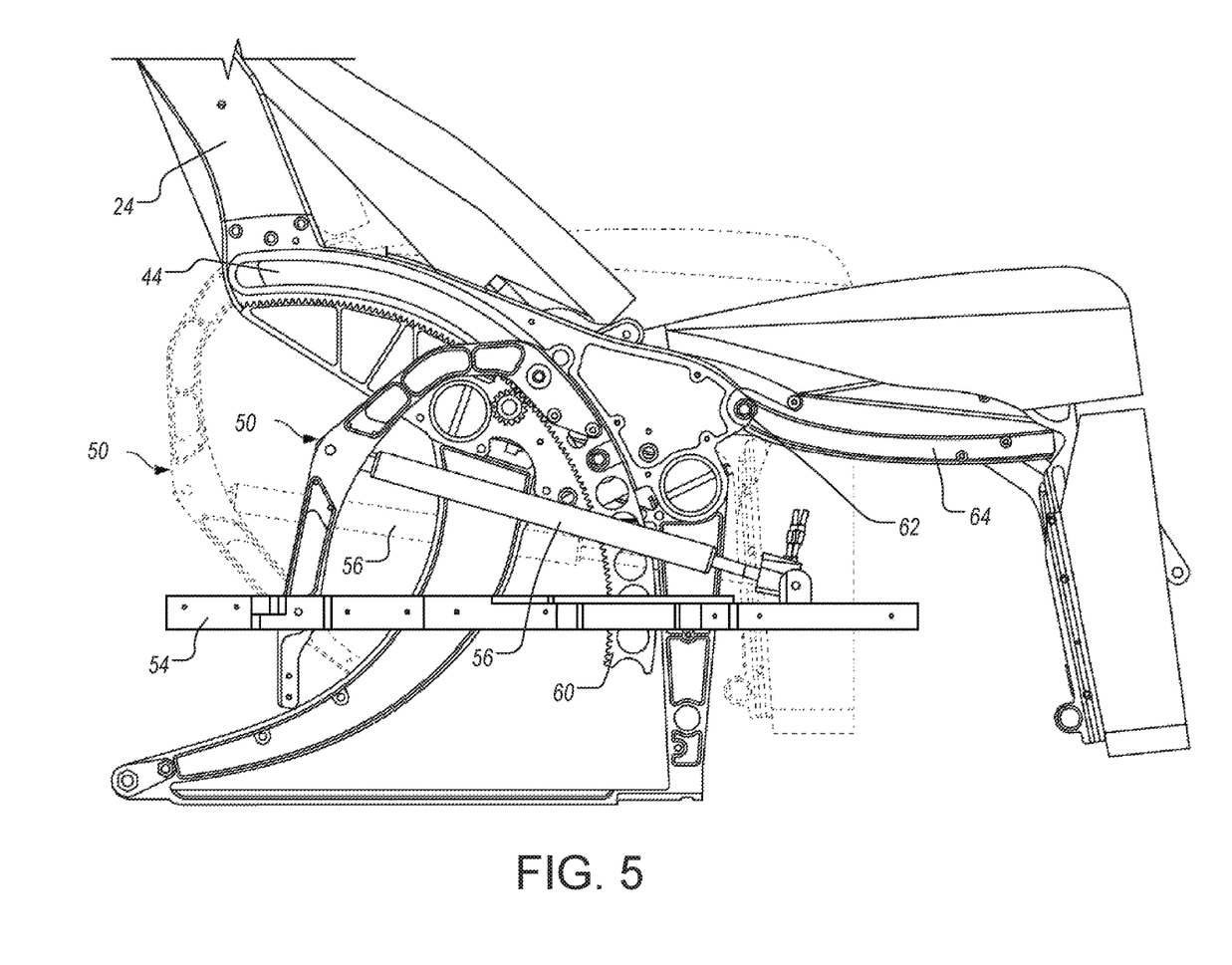
FIG. 5 is a comparative illustration showing both the upright and reclined sitting positions of FIGS. 4 and 5.

Referring to FIGS. 3-5, reclining movement is controlled by a cradling recline mechanism 43 positioned on opposite sides of and beneath the seat bottom 38. In a particular embodiment, the recline mechanism 43 allows the seat bottom 38 to translate from its upright sitting position approximately 23 centimeters forward into a cradle position in as little as 96 centimeters of seat pitch. The seatback 40 is attached to and pivots near the cushion reference point on the seat bottom 38. As best shown in FIG. 5, it can be seen that that seatback angle opens the farther the seat bottom 38 translates forward. Also, it can be seen that the seat bottom 38 lowers towards the floor, for example by about 2.5 centimeters, as it translates forward, with the rear of the seat bottom 38 lowering even more so, for example by about 6 centimeters. This seat bottom motion provides a cradling effect that improves reclined comfort. Additionally, since the reclined seat is lower to the floor, there is more effective living space for the passenger compared to typical linear translating seat mechanisms.

The seat bottom 38 engages and is guided along the arcuate roller track 44 by a vertically-oriented seat bottom attachment roller 46 of a link 48. A vertically-oriented idler roller 49 leads the seat bottom movement. The pathway of the seat bottom, for example, the forward and vertical translation distances of the seat bottom, can be customized by changing the shape and/or length of the arcuate roller track 44. In the upright sitting position, the roller 46 is positioned at the rearward most end of the arcuate roller track 44. In the fully reclined sitting position, the idler roller 49 is positioned at the forwardmost end of the arcuate roller track 44. The length of the arcuate roller track 44 can be customized to control the amount of travel of the seat bottom 38, and consequently the amount of seatback recline.

An arcuate linkage arm 50 moves with the seat bottom 38. One end of the arcuate linkage arm 50 is connected at one end about the seat pan attachment and pivot axis point 52, and at the other end is pivotably connected to a fixed horizontal frame member 54 positioned beneath the seat in a position elevated off the floor. A locking gas spring 56 is connected at one end to the arcuate linkage arm 50 and at the other end to the fixed horizontal frame member 54. The locking gas spring 56 is arranged beneath the seat bottom 38 to provide counterbalancing for the weight of the passenger as the seat reclines and returns upright. The locking gas spring 56 also accommodates infinite adjustability. The roller and linkage design allows a spring with a considerably shorter stroke length than conventional seat translation mechanisms, which minimizes the mechanisms spatial volume and thus weight.

The locking gas spring 56 is arranged such that the most force is exerted on the arcuate linkage arm 50 when the seat bottom 38 is closest to the fully reclined position. As the locking gas spring 56 nears the compressed state (i.e., full recline position) it pushes on the arcuate linkage arm 50 tangent to the travel arc, thus maximizing the mechanical advantage of the locking gas spring 56 relative to the upright sitting position. When the locking gas spring is fully extended (i.e., upright sitting position), the locking gas spring 56 is pushing against the arcuate linkage arm 50 at, for example, a 51° off tangency of the motion arc, which reduces the mechanical advantage of the locking gas spring 56 at the top of the arc. Very little force is needed at the top of the arc, so this arrangement, along with the high progressivity (300%) of the gas spring minimizes the force at the start of the recline arc. See, for example, FIG. 5 for comparative purposes of the locking gas spring 56 in the upright and reclined sitting positions.

A geared pinion timing axle 58, or pinion gear, rotatably carried on the spreaders keeps both sides of the seat bottom 38 running parallel. The gear on the end of the axle 58 is meshed with an arcuate toothed side rail 60 that moves along with the seat bottom 38. Gears and rails may be provided on both sides of the seat bottom 38. The arcuate toothed side rail 60 may be attached to the ends of the rollers 46, 49 on the outboard side of the spreaders. Vertically-oriented forward rollers 62 on the left and right spreaders help the rollers 46, 49 support the seat bottom 38 throughout its range of motion. The forward rollers 62 travel along arcuate tracks 64 defined on the opposite sides of the seat bottom 38.

Figure 6:
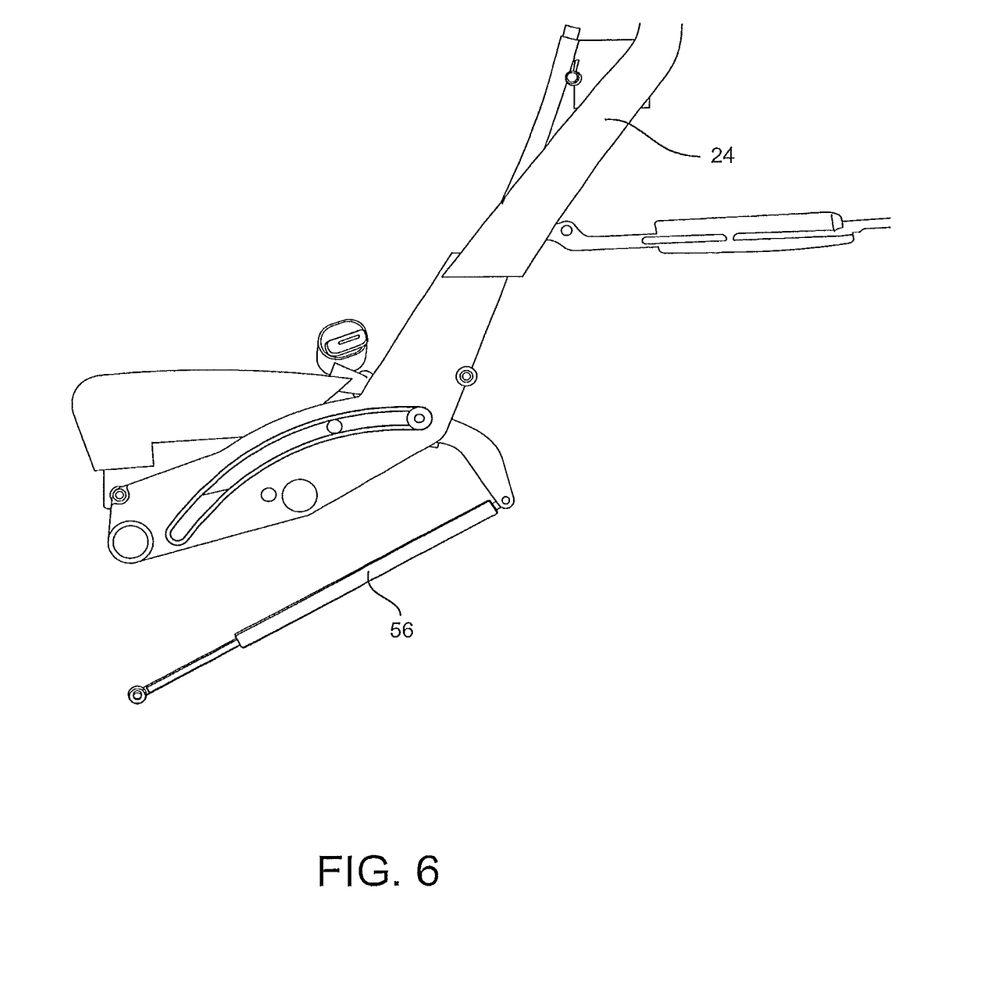
FIG. 6 is a left side view of an alternative seat embodiment employing a curved bearing block.
Figure 7:
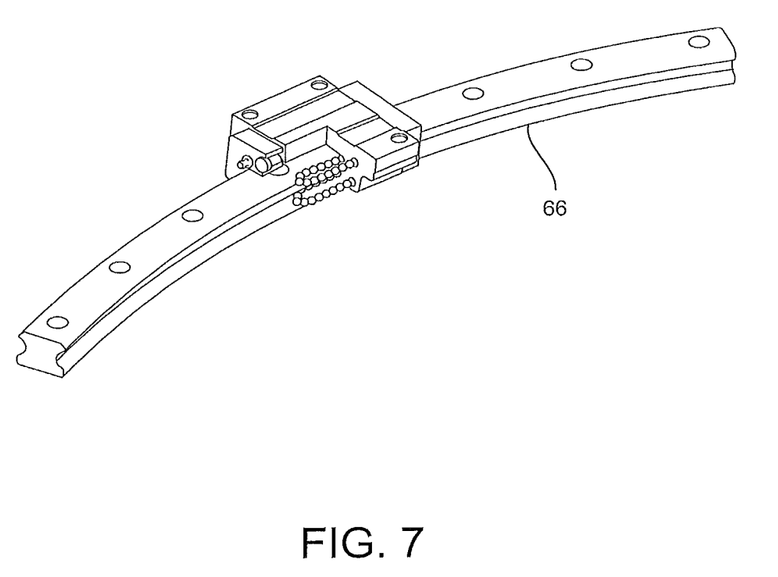
FIG. 7 is an isometric view of a curved bearing block suitable for use in the seat of FIG. 6.

Referring to FIGS. 6 and 7, in a second embodiment the seat 20 may utilize a curved bearing block in place of one of the integrated spreader roller assemblies described above. This allows the elimination of the arc center axle on the linkage arm and potentially the need for the pinion timing axle that ensures alignment of the roller tracks on either side of the seat bottom. One example of a bearing block and curved rail assembly suitable for use in the seat of the present invention is shown at reference numeral 66.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. An aircraft passenger seat, comprising:
 a seat bottom having a front edge and a rear edge;
 a seatback pivotably attached to the seat bottom proximate the rear edge and positioned forward of a fixed-shell; and
 a cradling recline mechanism directly coupled to a movable pivot axis of the seat bottom proximate the seatback, the cradling recline mechanism including an arcuate side rail, connected to the seat bottom, and a linkage arm coupled to a fixed frame member and the arcuate side rail that glides along a roller track, articulating the seat bottom between a first position and a second position by guiding the movable pivot axis along a curvature of the roller track;
 whereby, as the seat bottom moves from the first position to the second position, the cradling recline mechanism causes the seat bottom to translate forward and lower, wherein the rear edge of the seat bottom lowers more than the forward edge of the seat bottom such that the seat bottom is inclined to a greater degree when in the second position as compared to the seat bottom when in the first position, and causes the seatback to translate forward, lower, and recline.

2. The aircraft passenger seat of claim 1, wherein the cradling recline mechanism comprises a first roller configured to roll along the roller track.

3. The aircraft passenger seat of claim 2, wherein the first roller is a seat bottom attachment roller, and the cradling recline mechanism further comprises an idler roller positioned forward of the seat bottom attachment roller in the roller track.

4. The aircraft passenger seat of claim 3, wherein the seat bottom attachment roller is positioned at a rearwardmost end of the roller track when the seat bottom is in the first position, and the idler roller is positioned at a forwardmost end of the roller track when the seat bottom is in the second position.

5. The aircraft passenger seat of claim 1, wherein the seat bottom is horizontal in the first position and inclined in the direction of the front edge in the second position.

6. The aircraft passenger seat of claim 1, wherein the roller track includes a geared pinion timing axle meshed with teeth on the arcuate side rail to keep opposite sides of the seat bottom parallel.

7. The aircraft passenger seat of claim 1, further comprising a locking gas spring arranged such that maximum force is exerted on the linkage arm of the cradling recline mechanism when the seat bottom is in the second position, and when the seat bottom is in the first position the locking gas spring is fully extended and pushes against the linkage arm with minimum force.

8. The aircraft passenger seat of claim 7, wherein the locking gas spring is arranged between the linkage arm and the fixed frame member for counterbalancing passenger weight to return the seat bottom to the first position and prevent over acceleration into the second position.

9. The aircraft passenger seat of claim 1, wherein the curvature of the roller track is an arc.

10. An aircraft passenger seat configured for cradle recline movement, comprising:

a fixed seat frame;

a seat bottom having a front edge and a rear edge;

a seatback pivotably connected to the seat bottom proximate the rear edge such that seat bottom movement drives seatback movement between an upright sitting position of the aircraft passenger seat and a reclined sitting position of the aircraft passenger seat;

a seat bottom guide mechanism for articulating the seat bottom between the upright sitting position and the reclined sitting position, the seat bottom guide mechanism including a curved rail, with a bearing block that glides along the curved rail connected to the fixed seat frame, wherein the bearing block is connected to the seat bottom such that as the seat bottom moves from the upright sitting position to the reclined sitting position, the seat bottom guide mechanism causes the seat bottom to move forward and lower such that the rear edge of the seat bottom moves to a position lower than the front edge by following a trajectory first moving forward then downward, and causes the seatback to translate forward, lower, and recline; and a passenger weight counterbalancing mechanism arranged between the seat bottom guide mechanism and the fixed seat frame for counterbalancing passenger weight to return the seat bottom to the upright sitting position and to prevent over acceleration into the reclined sitting position.

11. The aircraft passenger seat of claim 10, wherein the curved rail includes a first end positioned higher than a second end.

12. The aircraft passenger seat of claim 10, wherein the seat bottom is horizontal when in the upright sitting position and inclined in the direction of the front edge when in the reclined sitting position.

13. The aircraft passenger seat of claim 10, wherein the seatback bears against a fixed shell as the aircraft passenger seat moves between the upright and reclined sitting positions.

14. The aircraft passenger seat of claim 10, wherein the seat bottom guide mechanism further comprises a linkage arm fixed at one end for movement with the seat bottom and pivotably attached proximate an opposite end thereof to the fixed seat frame positioned beneath the seat bottom.

15. The aircraft passenger seat of claim 14, wherein the passenger weight counterbalancing mechanism comprises a locking gas spring arranged such that maximum force of the locking gas spring is exerted on the linkage arm when the seat bottom is in the reclined sitting position, and when the seat bottom is in the upright sitting position the locking gas spring is fully extended and pushes against the linkage arm with minimum force.

* * * * *